US010462822B2

(12) United States Patent
Quan et al.

(10) Patent No.: US 10,462,822 B2
(45) Date of Patent: Oct. 29, 2019

(54) RANDOM ACCESS METHOD AND APPARATUS

(71) Applicant: Huawei Technologies Co., Ltd., Shenzhen (CN)

(72) Inventors: Wei Quan, Beijing (CN); Xiaodong Yang, Beijing (CN); Zhenxing Hu, Shenzhen (CN); Jian Zhang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 628 days.

(21) Appl. No.: 15/197,289

(22) Filed: Jun. 29, 2016

(65) Prior Publication Data

US 2016/0309519 A1 Oct. 20, 2016

Related U.S. Application Data

(63) Continuation of application No. PCT/CN2014/083887, filed on Aug. 7, 2014.

(30) Foreign Application Priority Data

Dec. 31, 2013 (CN) .......................... 2013 1 0753912

(51) Int. Cl.
*H04W 74/08* (2009.01)
*H04W 74/00* (2009.01)

(52) U.S. Cl.
CPC ..... *H04W 74/0833* (2013.01); *H04W 74/006* (2013.01)

(58) Field of Classification Search
CPC .................. H04W 74/006; H04W 74/0833
See application file for complete search history.

(56) References Cited

U.S. PATENT DOCUMENTS

2010/0272035 A1* 10/2010 Park .................... H04W 74/006
370/329
2011/0243075 A1 10/2011 Luo et al.
(Continued)

FOREIGN PATENT DOCUMENTS

| CN | 101340707 A | 1/2009 |
| CN | 101674661 A | 3/2009 |

(Continued)

*Primary Examiner* — Andrew Lai
*Assistant Examiner* — M Mostazir Rahman
(74) *Attorney, Agent, or Firm* — Leydig, Voit & Mayer, Ltd.

(57) ABSTRACT

Embodiments of the present invention disclose a random access method and an apparatus. According to the random access method disclosed in the embodiments, first downlink assignment information is obtained in a manner of a mapping relationship between first downlink assignment information and a preamble, where the first downlink assignment information is downlink assignment information used by a random access response message, and scheduling signaling of the random access response message does not need to be retransmitted by using the PDCCH channel, thereby resolving problems of a channel resource waste and an access delay in an existing random access method. The problems are caused because the PDCCH channel is used to retransmit the scheduling signaling of the random access response message.

16 Claims, 7 Drawing Sheets

(56) References Cited

U.S. PATENT DOCUMENTS

| | | |
|---|---|---|
| 2012/0188961 A1 | 7/2012 | Suzuki et al. |
| 2012/0218987 A1* | 8/2012 | Zhao ................. H04W 56/0005 370/350 |
| 2013/0322339 A1 | 12/2013 | Ohta et al. |
| 2015/0326995 A1 | 11/2015 | Li et al. |
| 2016/0309519 A1 | 10/2016 | Quan et al. |

FOREIGN PATENT DOCUMENTS

| | | |
|---|---|---|
| CN | 101754410 A | 6/2010 |
| CN | 102498746 A | 6/2012 |
| CN | 103220811 A | 7/2013 |
| CN | 103747534 A | 4/2014 |
| EP | 2177071 A1 | 3/2010 |
| EP | 2398294 A2 | 12/2011 |
| WO | WO 2008023932 A1 | 2/2008 |
| WO | WO 2009016260 A1 | 2/2009 |
| WO | WO 2011016377 A1 | 2/2011 |
| WO | WO 2012108046 A1 | 8/2012 |

* cited by examiner

RANDOM ACCESS METHOD AND APPARATUS

CROSS-REFERENCE TO RELATED APPLICATIONS

This application is a continuation of International Application No. PCT/CN2014/083887, filed on Aug. 7, 2014, which claims priority to Chinese Patent Application No. 201310753912.1, filed on Dec. 31, 2013, both of which are hereby incorporated by reference in their entireties.

TECHNICAL FIELD

The present invention relates to the field of communications technologies, and more specifically, to a random access method and an apparatus.

BACKGROUND

Methods for randomly accessing a wireless communications network by user equipment (UE) may be divided into two types: non-contention based access random and contention based random access.

In a contention based random access process, a base station sends a random access response message to the UE, and before the UE sends an uplink message to the base station according to the random access response message, the base station further needs to send scheduling signaling of the random access response message to the UE through a PDCCH (Physical Downlink Control Channel, physical downlink control channel) channel. The scheduling signaling of the random access response message includes information such as a physical resource, a modulation and coding scheme, a redundancy version, and an HARQ (Hybrid Automatic Repeat Request, hybrid automatic repeat request) process ID that are used when the UE receives the random access response message.

Moreover, in a coverage enhancement scenario, multiple channels used in communication between the UE and the base station need to be enhanced, including the PDCCH channel. In addition, a typical enhancement method is retransmitting content on the channel.

Therefore, in the foregoing random access process, the scheduling signaling of the random access response message is retransmitted on the PDCCH channel, which causes a channel resource waste and an access delay.

SUMMARY

In view of this, embodiments of the present invention provide a random access method, to resolve problems of a channel resource waste and an access delay in an existing random access method. The problems are caused because a PDCCH channel is used to retransmit scheduling signaling of a random access response message.

To achieve the foregoing objective, currently proposed solutions are as follows:

A first aspect of the embodiments of the present invention provides a random access method, including:

receiving, by a base station, a preamble sent by user equipment UE;

acquiring, by the base station according to a pre-obtained mapping relationship between first downlink assignment information and a preamble, first downlink assignment information corresponding to the preamble received by the base station, where the first downlink assignment information is downlink assignment information used by a random access response message; and sending, by the base station, the random access response message to the UE according to the first downlink assignment information.

With reference to the first aspect of the embodiments of the present invention, in a first implementation manner of the first aspect of the embodiments of the present invention, after the sending, by the base station, the random access response message to the UE, the method further includes:

receiving, by the base station by using pre-obtained first uplink grant information, an uplink message sent by the UE, where the uplink message carries identification information of the UE, and the first uplink grant information is uplink grant information used by the uplink message;

generating, by the base station, a contention resolution message according to the identification information of the UE that is carried in the uplink message; and sending, by the base station, the contention resolution message to the UE by using pre-obtained second downlink assignment information, where the second downlink assignment information is downlink assignment information used by the contention resolution message.

With reference to the first aspect of the embodiments of the present invention or the first implementation manner of the first aspect of the embodiments of the present invention, in a second implementation manner of the first aspect of the embodiments of the present invention, the mapping relationship between first downlink assignment information and a preamble is carried in a communications protocol, a broadcast message sent by the base station, or a dedicated message sent by the base station.

With reference to the first implementation manner of the first aspect of the embodiments of the present invention, in a third implementation manner of the first aspect of the embodiments of the present invention, a manner in which the base station pre-obtains the first uplink grant information includes:

acquiring, by the base station, a mapping relationship between first uplink grant information and a preamble; and acquiring, by the base station according to the mapping relationship between first uplink grant information and a preamble, first uplink grant information corresponding to the preamble received by the base station, where the mapping relationship between first uplink grant information and a preamble is carried in a communications protocol, a broadcast message sent by the base station, or a dedicated message sent by the base station.

With reference to the first implementation manner of the first aspect of the embodiments of the present invention, in a fourth implementation manner of the first aspect of the embodiments of the present invention, a manner in which the base station pre-obtains the first uplink grant information includes:

acquiring, by the base station, first uplink grant information carried in the random access response message sent by the base station.

With reference to the first implementation manner of the first aspect of the embodiments of the present invention, in a fifth implementation manner of the first aspect of the embodiments of the present invention, a manner in which the base station pre-obtains the second downlink assignment information includes:

acquiring, by the base station, a mapping relationship between second downlink assignment information and a preamble; and acquiring, by the base station according to the mapping relationship between second downlink assignment information and a preamble, second downlink assignment information corresponding to the preamble received by the base station, where the mapping relationship between second downlink assignment information and a preamble is carried in a communications protocol, a broadcast message sent by the base station, or a dedicated message sent by the base station.

With reference to the first implementation manner of the first aspect of the embodiments of the present invention, in a sixth implementation manner of the first aspect of the embodiments of the present invention, a manner in which the base station pre-obtains the second downlink assignment information includes:

acquiring, by the base station, second downlink assignment information carried in the random access response message sent by the base station.

With reference to the first implementation manner of the first aspect of the embodiments of the present invention, in a seventh implementation manner of the first aspect of the embodiments of the present invention, a time at which the UE receives the contention resolution message is further included in the random access response message sent by the base station, a broadcast message sent by the base station, a dedicated message sent by the base station, or a communications protocol.

With reference to the first implementation manner of the first aspect of the embodiments of the present invention, in an eighth implementation manner of the first aspect of the embodiments of the present invention, the generating, by the base station, a contention resolution message according to the identification information of the UE that is carried in the uplink message includes:

masking, by the base station, the contention resolution message by using the identification information of the UE; and writing, by the base station, the identification information of the UE into the contention resolution message.

With reference to the first implementation manner of the first aspect of the embodiments of the present invention, in a ninth implementation manner of the first aspect of the embodiments of the present invention, the contention resolution message further includes:

third downlink assignment information used when the base station sends data to the UE, or second uplink grant information used when the base station receives data sent by the UE.

With reference to the ninth implementation manner of the first aspect of the embodiments of the present invention, in a tenth implementation manner of the first aspect of the embodiments of the present invention, when the third downlink assignment information is used to control, at least twice, the base station to send the data to the UE, the contention resolution message further includes an interval of using the third downlink assignment information.

With reference to the ninth implementation manner of the first aspect of the embodiments of the present invention, in an eleventh implementation manner of the first aspect of the embodiments of the present invention, when the second uplink grant information is used to control, at least twice, the base station to receive the data sent by the UE, the contention resolution message further includes an interval of using the second uplink grant information.

A second aspect of the embodiments of the present invention provides a random access method, including:
sending, by user equipment UE, a preamble to a base station;

acquiring, by the UE according to a pre-obtained mapping relationship between first downlink assignment information and a preamble, first downlink assignment information corresponding to the preamble sent by the UE, where the first downlink assignment information is downlink assignment information used by a random access response message; and receiving, by the UE according to the first downlink assignment information, the random access response message sent by the base station.

With reference to the second aspect of the embodiments of the present invention, in a first implementation manner of the second aspect of the embodiments of the present invention, after the receiving, by the UE, the random access response message sent by the base station, the method further includes:

sending, by the UE, an uplink message to the base station by using pre-obtained first uplink grant information, where the uplink message carries identification information of the UE, and the first uplink grant information is uplink grant information used by the uplink message;

receiving, by the UE by using pre-obtained second downlink assignment information, a contention resolution message sent by the base station, where the second downlink assignment information is downlink assignment information used by the contention resolution message; and obtaining, by the UE, a contention resolution result according to the contention resolution message.

With reference to the second aspect of the embodiments of the present invention or the first implementation manner of the second aspect of the embodiments of the present invention, in a second implementation manner of the second aspect of the embodiments of the present invention, the mapping relationship between first downlink assignment information and a preamble is carried in a communications protocol, a broadcast message sent by the base station, or a dedicated message sent by the base station.

With reference to the first implementation manner of the second aspect of the embodiments of the present invention, in a third implementation manner of the second aspect of the embodiments of the present invention, a manner in which the UE pre-obtains the first uplink grant information includes:

acquiring, by the UE, a mapping relationship between first uplink grant information and a preamble; and acquiring, by the UE according to the mapping relationship between first uplink grant information and a preamble, first uplink grant information corresponding to the preamble sent by the UE, where the mapping relationship between first uplink grant information and a preamble is carried in a communications protocol, a broadcast message sent by the base station, or a dedicated message sent by the base station.

With reference to the first implementation manner of the second aspect of the embodiments of the present invention, in a fourth implementation manner of the second aspect of the embodiments of the present invention, a manner in which the UE pre-obtains the first uplink grant information includes:

acquiring, by the UE, first uplink grant information carried in the random access response message received by the UE.

With reference to the first implementation manner of the second aspect of the embodiments of the present invention, in a fifth implementation manner of the second aspect of the embodiments of the present invention, a manner in which the UE pre-obtains the second downlink assignment information includes:

acquiring, by the UE, a mapping relationship between second downlink assignment information and a preamble; and acquiring, by the UE according to the mapping relationship between second downlink assignment information and a preamble, second downlink assignment information corresponding to the preamble sent by the UE, where the mapping relationship between second downlink assignment information and a preamble is carried in a communications protocol, a broadcast message sent by the base station, or a dedicated message sent by the base station.

With reference to the first implementation manner of the second aspect of the embodiments of the present invention, in a sixth implementation manner of the second aspect of the embodiments of the present invention, a manner in which the UE pre-obtains the second downlink assignment information includes:

acquiring, by the UE, second downlink assignment information carried in the random access response message received by the UE.

With reference to the first implementation manner of the second aspect of the embodiments of the present invention, in a seventh implementation manner of the second aspect of the embodiments of the present invention, after the sending, by the UE, an uplink message to the base station, the method further includes:

acquiring, by the UE, a time at which the UE receives the contention resolution message, where the time at which the UE receives the contention resolution message is carried in the random access response message sent by the base station, a communications protocol, a broadcast message sent by the base station, or a dedicated message sent by the base station.

With reference to the first implementation manner of the second aspect of the embodiments of the present invention, in an eighth implementation manner of the second aspect of the embodiments of the present invention, the obtaining, by the UE, a contention resolution result according to the contention resolution message includes:

demasking, by the UE, the contention resolution message to obtain the identification information of the UE; and obtaining, by the UE, the contention resolution result according to the identification information of the UE.

With reference to the first implementation manner of the second aspect of the embodiments of the present invention, in a ninth implementation manner of the second aspect of the embodiments of the present invention, the obtaining, by the UE, a contention resolution result according to the contention resolution message includes:

acquiring, by the UE, the identification information of the UE that is carried in the contention resolution message; and obtaining, by the UE, the contention resolution result according to the identification information of the UE.

With reference to the first implementation manner of the second aspect of the embodiments of the present invention, in a tenth implementation manner of the second aspect of the embodiments of the present invention, the contention resolution message received by the UE further includes:

third downlink assignment information used when the UE receives data sent by the base station, or second uplink grant information used when the UE sends data to the base station.

With reference to the tenth implementation manner of the second aspect of the embodiments of the present invention, in an eleventh implementation manner of the second aspect of the embodiments of the present invention, when the third downlink assignment information is used to control, at least twice, the UE to receive the data sent by the base station, the contention resolution message further includes an interval of using the third downlink assignment information.

With reference to the tenth implementation manner of the second aspect of the embodiments of the present invention, in a twelfth implementation manner of the second aspect of the embodiments of the present invention, when the second uplink grant information is used to control, at least twice, the UE to send the data to the base station, the contention resolution message further includes an interval of using the second uplink grant information.

A third aspect of the embodiments of the present invention provides a base station, including:

a first receiving unit, configured to receive a preamble sent by user equipment UE;

a first acquiring unit, configured to acquire, according to a pre-obtained mapping relationship between first downlink assignment information and a preamble, first downlink assignment information corresponding to the preamble received by the first receiving unit, where the first downlink assignment information is downlink assignment information used by a random access response message; and a first sending unit, configured to send the random access response message to the UE according to the first downlink assignment information.

With reference to the third aspect of the embodiments of the present invention, in a first implementation manner of the third aspect of the embodiments of the present invention, the base station further includes:

a second receiving unit, configured to receive, by using pre-obtained first uplink grant information, an uplink message sent by the UE, where the uplink message carries identification information of the UE, and the first uplink grant information is uplink grant information used by the uplink message;

a generation unit, configured to generate a contention resolution message according to the identification information of the UE that is carried in the uplink message; and a second sending unit, configured to send the contention resolution message to the UE by using pre-obtained second downlink assignment information, where the second downlink assignment information is downlink assignment information used by the contention resolution message.

With reference to the third aspect of the embodiments of the present invention or the first implementation manner of the third aspect of the embodiments of the present invention, in a second implementation manner of the third aspect of the embodiments of the present invention, the mapping relationship between first downlink assignment information and a preamble is carried in a communications protocol, a broadcast message sent by the base station, or a dedicated message sent by the base station.

With reference to the first implementation manner of the third aspect of the embodiments of the present invention, in a third implementation manner of the third aspect of the embodiments of the present invention, further includes:

a second acquiring unit, configured to acquire a mapping relationship between first uplink grant information and a preamble, where the mapping relationship between first uplink grant information and a preamble is carried in a communications protocol, a broadcast message sent by the base station, or a dedicated message sent by the base station; and a third acquiring unit, configured to acquire, according to the mapping relationship that is between first uplink grant information and a preamble and that is acquired by the second acquiring unit, first uplink grant information corresponding to the preamble received by the first receiving unit.

With reference to the first implementation manner of the third aspect of the embodiments of the present invention, in a fourth implementation manner of the third aspect of the embodiments of the present invention, the base station further includes:

a fourth acquiring unit, configured to acquire first uplink grant information carried in the random access response message sent by the first sending unit.

With reference to the first implementation manner of the third aspect of the embodiments of the present invention, in a fifth implementation manner of the third aspect of the embodiments of the present invention, the base station further includes:

a fifth acquiring unit, configured to acquire a mapping relationship between second downlink assignment information and a preamble, where the mapping relationship between second downlink assignment information and a preamble is carried in a communications protocol, a broadcast message sent by the base station, or a dedicated message sent by the base station; and a sixth acquiring unit, configured to acquire, according to the mapping relationship that is between second downlink assignment information and a preamble and that is acquired by the fifth acquiring unit, second downlink assignment information corresponding to the preamble received by the first receiving unit.

With reference to the first implementation manner of the third aspect of the embodiments of the present invention, in a sixth implementation manner of the third aspect of the embodiments of the present invention, the base station further includes:

a seventh acquiring unit, configured to acquire second downlink assignment information carried in the random access response message sent by the first sending unit.

With reference to the first implementation manner of the third aspect of the embodiments of the present invention, in a seventh implementation manner of the third aspect of the embodiments of the present invention, a time at which the UE receives the contention resolution message is further included in the random access response message sent by the base station, a broadcast message sent by the base station, a dedicated message sent by the base station, or a communications protocol.

With reference to the first implementation manner of the third aspect of the embodiments of the present invention, in an eighth implementation manner of the third aspect of the embodiments of the present invention, the generation unit further includes:

a first generation unit, configured to mask the contention resolution message by using the identification information of the UE; and a second generation unit, configured to write the identification information of the UE into the contention resolution message.

With reference to the first implementation manner of the third aspect of the embodiments of the present invention, in a ninth implementation manner of the third aspect of the embodiments of the present invention, the contention resolution message further includes:

third downlink assignment information used when the base station sends data to the UE, or second uplink grant information used when the base station receives data sent by the UE.

With reference to the ninth implementation manner of the third aspect of the embodiments of the present invention, in a tenth implementation manner of the third aspect of the embodiments of the present invention, when the third downlink assignment information is used to control, at least twice, the base station to send the data to the UE, the contention resolution message further includes an interval of using the third downlink assignment information.

With reference to the ninth implementation manner of the third aspect of the embodiments of the present invention, in an eleventh implementation manner of the third aspect of the embodiments of the present invention, when the second uplink grant information is used to control, at least twice, the base station to receive the data sent by the UE, the contention resolution message further includes an interval of using the second uplink grant information.

A fourth aspect of the embodiments of the present invention provides user equipment UE, including:

a first sending unit, configured to send a preamble to a base station;

a first acquiring unit, configured to acquire, according to a pre-obtained mapping relationship between first downlink assignment information and a preamble, first downlink assignment information corresponding to the preamble sent by the first sending unit, where the first downlink assignment information is downlink assignment information used by a random access response message; and a first receiving unit, configured to receive, according to the first downlink assignment information, the random access response message sent by the base station.

With reference to the fourth aspect of the embodiments of the present invention, in a first possible implementation manner of the fourth aspect of the embodiments of the present invention, the user equipment further includes:

a second sending unit, configured to send an uplink message to the base station by using pre-obtained first uplink grant information, where the uplink message carries identification information of the UE, and the first uplink grant information is uplink grant information used by the uplink message;

a second receiving unit, configured to receive, by using pre-obtained second downlink assignment information, a contention resolution message sent by the base station, where the second downlink assignment information is downlink assignment information used by the contention resolution message; and a contention result generation unit, configured to obtain a contention resolution result according to the contention resolution message.

With reference to the fourth aspect of the embodiments of the present invention or the first implementation manner of the fourth aspect of the embodiments of the present invention, in a second implementation manner of the fourth aspect of the embodiments of the present invention, the mapping relationship between first downlink assignment information and a preamble is carried in a communications protocol, a broadcast message sent by the base station, or a dedicated message sent by the base station.

With reference to the first implementation manner of the fourth aspect of the embodiments of the present invention, in a third implementation manner of the fourth aspect of the embodiments of the present invention, the user equipment further includes:

a second acquiring unit, configured to acquire a mapping relationship between first uplink grant information and a preamble, where the mapping relationship between first uplink grant information and a preamble is carried in a communications protocol, a broadcast message sent by the base station, or a dedicated message sent by the base station; and a third acquiring unit, configured to acquire, according to the mapping relationship between first uplink grant information and a preamble, first uplink grant information corresponding to the preamble sent by the first sending unit.

With reference to the first implementation manner of the fourth aspect of the embodiments of the present invention, in a fourth implementation manner of the fourth aspect of the embodiments of the present invention, the user equipment further includes:

a fourth acquiring unit, configured to acquire first uplink grant information carried in the random access response message received by the first receiving unit.

With reference to the first implementation manner of the fourth aspect of the embodiments of the present invention, in a fifth implementation manner of the fourth aspect of the embodiments of the present invention, the user equipment further includes:

a fifth acquiring unit, configured to acquire a mapping relationship between second downlink assignment information and a preamble, where the mapping relationship between second downlink assignment information and a preamble is carried in a communications protocol, a broadcast message sent by the base station, or a dedicated message sent by the base station; and a sixth acquiring unit, configured to acquire, according to the mapping relationship between second downlink assignment information and a preamble, second downlink assignment information corresponding to the preamble sent by the first sending unit.

With reference to the first implementation manner of the fourth aspect of the embodiments of the present invention, in a sixth implementation manner of the fourth aspect of the embodiments of the present invention, the user equipment further includes:

a seventh acquiring unit, configured to acquire second downlink assignment information carried in the random access response message received by the first receiving unit.

With reference to the first implementation manner of the fourth aspect of the embodiments of the present invention, in a seventh implementation manner of the fourth aspect of the embodiments of the present invention, the user equipment further includes:

an eighth acquiring unit, configured to acquire a time at which the first receiving unit receives the contention resolution message, where the time at which the first receiving unit receives the contention resolution message is carried in the random access response message sent by the base station, a communications protocol, a broadcast message sent by the base station, or a dedicated message sent by the base station.

With reference to the first implementation manner of the fourth aspect of the embodiments of the present invention, in an eighth implementation manner of the fourth aspect of the embodiments of the present invention, the contention result generation unit includes:

a demasking unit, configured to demask the contention resolution message to obtain the identification information of the UE; and a first contention result generating subunit, configured to obtain the contention resolution result according to the identification information of the UE.

With reference to the first implementation manner of the fourth aspect of the embodiments of the present invention, in a ninth implementation manner of the fourth aspect of the embodiments of the present invention, the contention result generation unit includes:

a ninth acquiring unit, configured to acquire the identification information of the UE that is carried in the contention resolution message; and a second contention result generating subunit, configured to obtain the contention resolution result according to the identification information of the UE.

With reference to the first implementation manner of the fourth aspect of the embodiments of the present invention, in a tenth implementation manner of the fourth aspect of the embodiments of the present invention, the contention resolution message received by the UE further includes:

third downlink assignment information used when the UE receives data sent by the base station, or second uplink grant information used when the UE sends data to the base station.

With reference to the tenth implementation manner of the fourth aspect of the embodiments of the present invention, in an eleventh implementation manner of the fourth aspect of the embodiments of the present invention, when the third downlink assignment information is used to control, at least twice, the UE to receive the data sent by the base station, the contention resolution message further includes an interval of using the third downlink assignment information.

With reference to the tenth implementation manner of the fourth aspect of the embodiments of the present invention, in a twelfth implementation manner of the fourth aspect of the embodiments of the present invention, when the second uplink grant information is used to control, at least twice, the UE to send the data to the base station, the contention resolution message further includes an interval of using the second uplink grant information.

It can be learned from the foregoing technical solutions that, according to the random access method disclosed in the embodiments of the present invention, first downlink assignment information is obtained in a manner of a mapping relationship between first downlink assignment information and a preamble, where the first downlink assignment information is downlink assignment information used by a random access response message, and scheduling signaling of the random access response message does not need to be retransmitted by using a PDCCH channel, thereby resolving problems of a channel resource waste and an access delay in an existing random access method. The problems are caused because the PDCCH channel is used to retransmit the scheduling signaling of the random access response message.

BRIEF DESCRIPTION OF DRAWINGS

To describe the technical solutions in the embodiments of the present invention more clearly, the following briefly describes the accompanying drawings required for describing the embodiments or the prior art. Apparently, the accompanying drawings in the following description show merely some embodiments of the present invention, and persons of ordinary skill in the art may still derive other drawings from these accompanying drawings without creative efforts.

DESCRIPTION OF EMBODIMENTS

Technical solutions provided in embodiments of the present invention may be applied to various wireless communications networks such as a global system for mobile communications (GSM), a code division multiple access (CDMA) system, a wideband code division multiple access (WCDMA) system, a universal mobile telecommunication system (UMTS), a general packet radio service (GPRS) system, a long term evolution (LTE) system, a long term evolution advanced (LTE-A) system, and a worldwide interoperability for microwave access (WiMAX) system. The terms "network" and "system" can be interchanged with each other.

In the embodiments of the present invention, a base station (base station, BS for short) may be a device communicating with user equipment (UE) or another communication station such as a relay station, and the base station may provide communication coverage in a specific physical area. For example, the base station may be specifically a base transceiver station (BTS) or a base station controller (BSC) in GSM or CDMA; or may be a NodeB (NB) in UMTS or a radio network controller (RNC) in UMTS; or may be an evolved NodeB (ENB or eNodeB) in LTE; or may be another access network device providing an access service in a wireless communications network, which is not limited in the present invention.

In the embodiments of the present invention, the UE may be distributed in an entire wireless network, and each UE may be stationary or in motion. The UE may be referred to as a terminal (terminal), a mobile station (mobile station), a subscriber unit (subscriber unit), a station (station), or the like. The UE may be a cellular phone (cellular phone), a personal digital assistant (PDA), a wireless modem (modem), a wireless communications device, a handheld device (handheld), a laptop computer (laptop computer), a cordless phone (cordless phone), a wireless local loop (WLL) station, or the like. When the UE is applied to communication in an M2M manner, the UE may be referred to as an M2M terminal and may be specifically a smart meter, a smart appliance, or the like that supports M2M communication.

Figure 1:
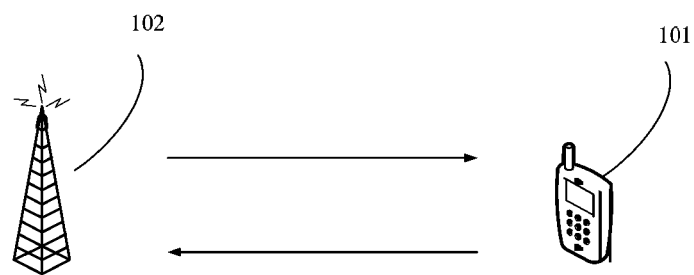
FIG. 1 is a schematic structural diagram of a communications system.

FIG. 1 is a communications system according to an embodiment of the present invention, where the communications system includes UE 101 and a base station 102 providing an access service for the UE 101. The UE 101 is configured to send a preamble to the base station 102. The base station 102 is configured to: after acquiring, according to a pre-obtained mapping relationship between first downlink assignment information and a preamble, first downlink assignment information corresponding to the preamble received by the base station, send a random access response message to the UE according to the first downlink assignment information.

Figure 2:
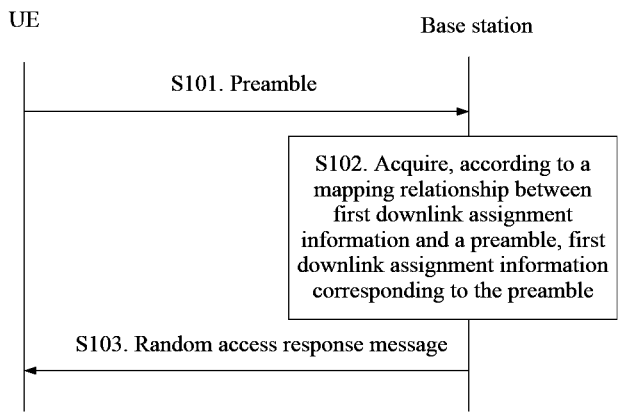
FIG. 2 is a sequence diagram of a random access method according to an embodiment of the present invention.
Figure 3:
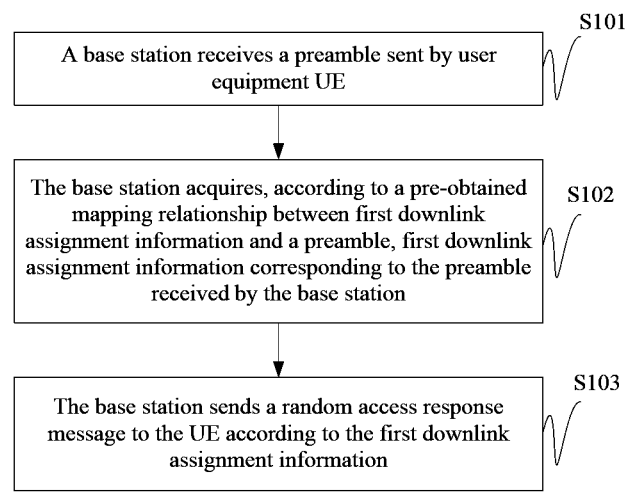
FIG. 3 is a flowchart of a random access method according to an embodiment of the present invention.

To resolve problems of a resource waste and an access delay in an existing random access method that are caused because the PDCCH channel is used to retransmit scheduling signaling, a random access method provided in this embodiment of the present invention is used in the communications system. With reference to FIG. 2 and FIG. 3, the random access method includes:

S101. A base station receives a preamble sent by user equipment UE.

In this step, the preamble sent by the UE may be a dedicated preamble configured by the base station for the UE. In this case, the random access method disclosed in this embodiment is a non-contention based random access method.

In addition, when the base station configures the dedicated preamble for the UE, the base station further configures a PRACH (Physical Random Access Channel, physical random access channel) resource of the preamble for the UE. Specifically, a manner in which the base station configures the dedicated preamble and the PRACH resource of the preamble for the UE may be configured by using a command transmitted on a PDCCH (Physical Downlink Control channel, physical downlink control channel), or may be configured by using an RRC (Radio Resource Control, radio resource control) message.

Certainly, in this step, the preamble sent by the UE may be a preamble randomly selected by the UE, and the UE sends the preamble to the base station on an available PRACH resource.

S102. The base station acquires, according to a pre-obtained mapping relationship between first downlink assignment information and a preamble, first downlink assignment information corresponding to the preamble received by the base station.

The first downlink assignment information is downlink assignment information used by a random access response message.

Specifically, after receiving the preamble, the base station needs to send the random access response message to the UE that sends the preamble, and before sending the random access response message, the base station needs to obtain the downlink assignment information used by the random access response message, that is, the first downlink assignment information.

The first downlink assignment information includes information such as a physical resource, a modulation and coding scheme, a redundancy version, and an HARQ (Hybrid Automatic Repeat Request, hybrid automatic repeat request) process ID that are used by the random access response message.

In this embodiment, there is a mapping relationship between the first downlink assignment information and the preamble, and the base station may obtain, by means of the mapping relationship, the first downlink assignment information corresponding to the preamble received by the base station, where an example in which there is a mapping relationship between the first downlink assignment information and the preamble is as follows:

For a preamble 1, in corresponding first downlink assignment information, physical resources are PRBs 0-6, a modulation and coding scheme is QPSK and 1/3 coding, a redundancy version is 1, and an HARQ process ID is 1; and for a preamble 2, in corresponding first downlink assignment information, physical resources are PRBs 7-11, a modulation and coding scheme is QPSK and 1/3 coding, a redundancy version is 1, and an HARQ process ID is 2.

Preferably, in another embodiment of the present invention, a manner in which the base station pre-obtains the mapping relationship between first downlink assignment information and a preamble includes:

acquiring, by the base station, the mapping relationship that is between first downlink assignment information and a preamble and that is originally in a communications protocol, carried in a broadcast message sent by the base station, or carried in a dedicated message sent by the base station to the UE.

S103. The base station sends a random access response message to the UE according to the first downlink assignment information.

According to the random access method disclosed in this embodiment of the present invention, first downlink assignment information is obtained in a manner of a mapping relationship between first downlink assignment information and a preamble, where the first downlink assignment information is downlink assignment information used by a random access response message, and scheduling signaling of the random access response message does not need to be retransmitted by using the PDCCH channel, thereby resolving problems of a channel resource waste and an access delay in an existing random access method. The problems are caused because the PDCCH channel is used to retransmit the scheduling signaling of the random access response message.

It should be noted herein that, in this embodiment of the present invention, a mapping relationship is set between a preamble and downlink assignment information that is used by a random access response message, and the base station and the UE separately obtain, by using the mapping relationship, downlink assignment information that is used by the random access response message and that is corresponding to the preamble is a solution proposed when persons skilled in the art are resolving a problem in an existing contention based random access method. Then, the persons skilled in the art find by searching that the solution may further be applied to a non-contention based random access method. However, for the persons skilled in the art, creative efforts are also required when a process of the foregoing solution is applied to the non-contention based random access method.

Figure 4:
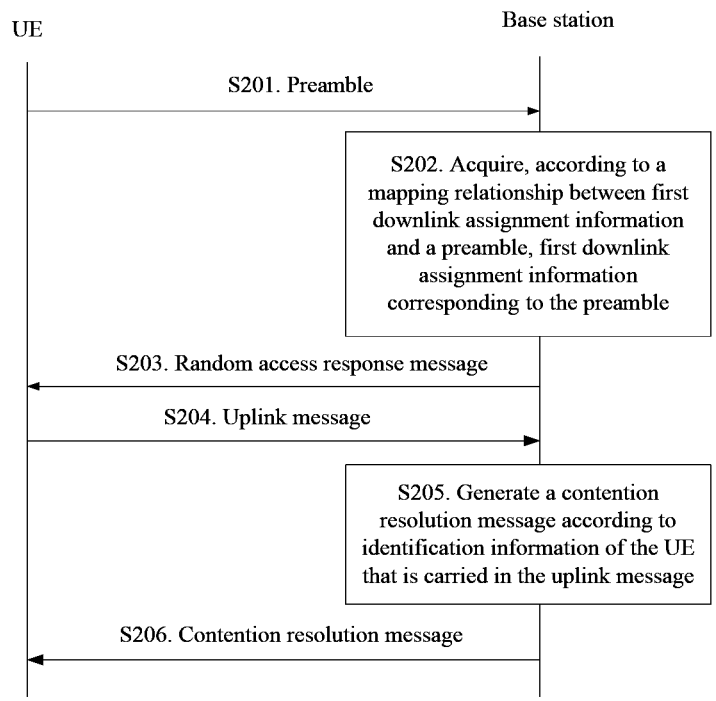
FIG. 4 is a sequence diagram of a random access method according to another embodiment of the present invention.
Figure 5:
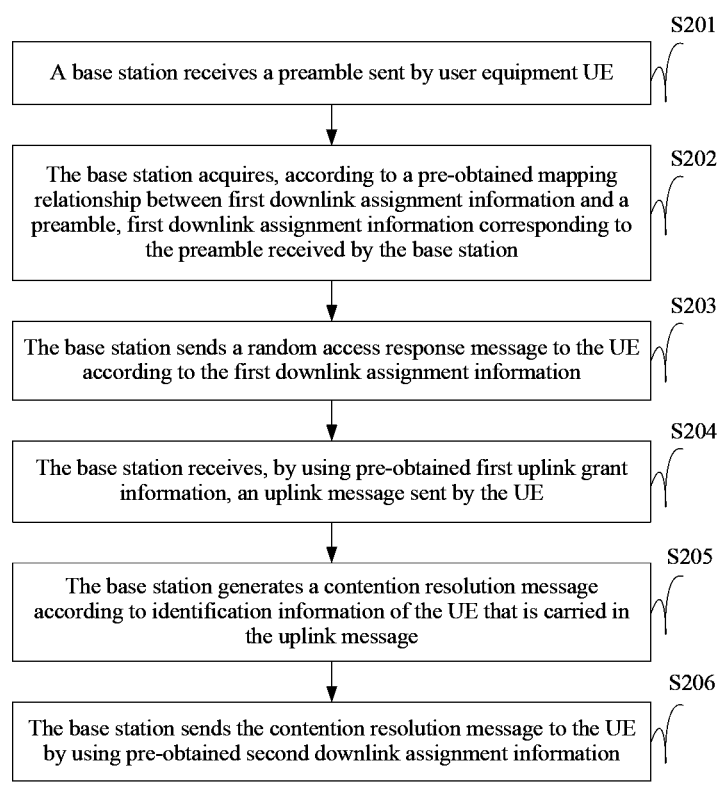
FIG. 5 is a flowchart of a random access method according to another embodiment of the present invention.

Another embodiment of the present invention further discloses a random access method. With reference to FIG. 3 and FIG. 4, includes:

S201. A base station receives a preamble sent by user equipment UE.

S202. The base station acquires, according to a pre-obtained mapping relationship between first downlink assignment information and a preamble, first downlink assignment information corresponding to the preamble received by the base station.

The first downlink assignment information is downlink assignment information used by a random access response message.

S203. The base station sends a random access response message to the UE according to the first downlink assignment information.

S204. The base station receives, by using pre-obtained first uplink grant information, an uplink message sent by the UE.

The uplink message carries identification information of the UE, and the first uplink grant information is uplink grant information used by the uplink message.

Specifically, after the base station sends the random access response message to the UE, the UE returns the uplink message to the base station, and before receiving the uplink message sent by the UE, the base station needs to obtain the uplink grant information used by the uplink message, that is, the first uplink grant information.

The first uplink grant information includes information such as a physical resource, a modulation and coding scheme, a redundancy version, and an HARQ (Hybrid Automatic Repeat Request, hybrid automatic repeat request) process ID that are used by the uplink message.

In another embodiment of the present invention, a manner in which the base station pre-obtains the first uplink grant information includes:

acquiring, by the base station, a mapping relationship between first uplink grant information and a preamble, where the mapping relationship between first uplink grant information and a preamble is carried in a communications protocol, a broadcast message sent by the base station, or a dedicated message sent by the base station; and acquiring, by the base station according to the mapping relationship between first uplink grant information and a preamble, first uplink grant information corresponding to the preamble received by the base station.

In addition, in another embodiment of the present invention, the manner in which the base station pre-obtains the first uplink grant information may be:

acquiring, by the base station, first uplink grant information carried in the random access response message sent by the base station.

Specifically, the random access response message sent by the base station pre-carries the first uplink grant information, and the base station may obtain the first uplink grant information by using the random access response message.

S205. The base station generates a contention resolution message according to the identification information of the UE that is carried in the uplink message.

Preferably, a manner in which the base station generates the contention resolution message according to the identification information of the UE includes the following two types, which are specifically:

generating the contention resolution message in a manner in which the base station writes the identification information of the UE into the contention resolution message; and generating the contention resolution message in a manner in which the base station masks the contention resolution message by using the identification information of the UE.

Alternatively, the manner in which the base station generates the contention resolution message according to the identification may be: after writing the identification information of the UE into the contention resolution message, masking, by the base station, the contention resolution message by using the identification information of the UE.

S206. The base station sends the contention resolution message to the UE by using pre-obtained second downlink assignment information.

The second downlink assignment information is downlink assignment information used by the contention resolution message.

Specifically, after generating the contention resolution message, the base station sends the contention resolution message to the UE by using the downlink assignment information used by the contention resolution message. Therefore, the base station needs to obtain the downlink assignment information used by the contention resolution message, that is, the second downlink assignment information.

It should be pointed out herein that the downlink assignment information used by the contention resolution message includes information such as a physical resource, a modulation and coding scheme, a redundancy version, and an HARQ (Hybrid Automatic Repeat Request, hybrid automatic repeat request) process ID that are used by the contention resolution message.

Preferably, in another embodiment of the present invention, a manner in which the base station pre-obtains the second downlink assignment information includes:

acquiring, by the base station, a mapping relationship between second downlink assignment information and a preamble; and acquiring, by the base station according to the mapping relationship between second downlink assignment information and a preamble, second downlink assignment information corresponding to the preamble received by the base station, where the mapping relationship between second downlink assignment information and a preamble is carried in a communications protocol, a broadcast message sent by the base station, or a dedicated message sent by the base station.

In addition, in another embodiment of the present invention, the manner in which the base station pre-obtains the second downlink assignment information may further be: acquiring, by the base station, the second downlink assignment information carried in the random access response message sent by the base station.

In this case, the random access response message sent by the base station carries the second downlink assignment information, and the base station may obtain the second downlink assignment information by reading data in the random access response message.

Preferably, in another embodiment of the present invention, the random access response message sent by the base station may further carry a time at which the UE receives the contention resolution message. Specifically, the time at which the UE receives the contention resolution message and that is carried in the random access response message may be an absolute time, or may be an interval between a receiving time of the contention resolution message and a receiving time of the random access response message.

Alternatively, the time at which the UE receives the contention resolution message may be carried in a communications protocol, a broadcast message sent by the base station, or a dedicated message sent by the base station. Likewise, the time at which the UE receives the contention resolution message may be an absolute time, or may be an interval between a receiving time of the contention resolution message and a receiving time of the random access response message.

Preferably, in another embodiment of the present invention, the contention resolution message sent by the base station may further carry third downlink assignment information used when the base station sends data to the UE, where the third downlink assignment information includes information such as a physical resource, a modulation and coding scheme, a redundancy version, and an HARQ (Hybrid Automatic Repeat Request, hybrid automatic repeat request) process ID that are used by the data sent by the base station.

In this way, after a random access process is completed, the base station may acquire the third downlink assignment information in the contention resolution message, and sends the data according to the third downlink assignment information.

It should be noted herein that when the third downlink assignment information is used to control, at least twice, the base station to send the data to the UE, the contention resolution message further carries an interval of using the third downlink assignment information and use times of the third downlink assignment information.

Certainly, the contention resolution message sent by the base station may also carry second uplink grant information used when the base station receives data sent by the UE, where the second uplink grant information includes information such as a physical resource, a modulation and coding scheme, a redundancy version, and an HARQ (Hybrid Automatic Repeat Request, hybrid automatic repeat request) process ID that are used by the data received by the base station.

Likewise, after a random access process is completed, the base station may acquire the second uplink grant information in the contention resolution message, and receives, according to the second uplink grant information, the data sent by the UE.

Likewise, it should be noted that if the second uplink grant information is used to control, at least twice, the base station to receive the data sent by the UE, the contention resolution message further carries an interval of using the second uplink grant information and use times of the second uplink grant information.

Figure 6:
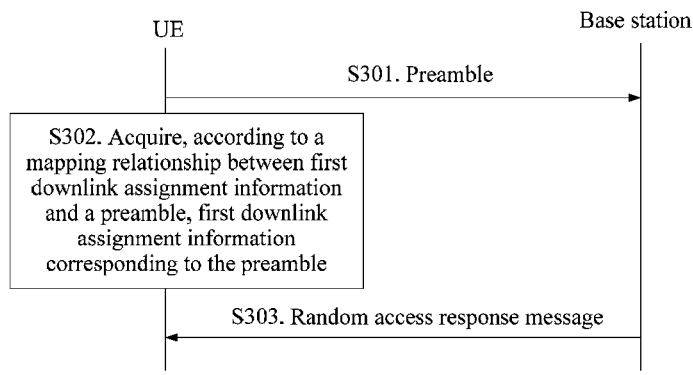
FIG. 6 is a sequence diagram of a random access method according to another embodiment of the present invention.

Another embodiment of the present invention further discloses a random access method. With reference to FIG. 6, the random access method includes:

S301. User equipment UE sends a preamble to a base station.

Same as an embodiment corresponding to FIG. 2, the preamble sent by the UE is a dedicated preamble configured by the base station for the UE. In this case, the random access method disclosed in this embodiment is a non-contention based random access method. The preamble sent by the UE may further be a preamble randomly selected by the UE, and the UE sends the preamble to the base station on an available PRACH resource.

When the preamble sent by the UE is the dedicated preamble configured by the base station for the UE, and when the base station configures the dedicated preamble for the UE, the base station further configures a PRACH (Physical Random Access Channel, physical random access channel) resource of the preamble for the UE. Specifically, a manner in which the base station configures the dedicated preamble and the PRACH resource of the preamble for the UE may be configured by using a command transmitted on a PDCCH (Physical Downlink Control Channel, physical downlink control channel), or may be configured by using an RRC (Radio Resource Control, radio resource control) message.

S302. The UE acquires, according to a pre-obtained mapping relationship between first downlink assignment information and a preamble, first downlink assignment information corresponding to the preamble sent by the UE.

The first downlink assignment information is downlink assignment information used by a random access response message.

Specifically, after the base station sends the random access response message, the UE needs to receive the random access response message according to the first downlink assignment information, and in this case, the UE needs to obtain the first downlink assignment information. It should be pointed out that the first downlink assignment information includes information such as a physical resource, a modulation and coding scheme, a redundancy version, and an HARQ (Hybrid Automatic Repeat Request, hybrid automatic repeat request) process ID that are used by the random access response message.

In another embodiment of the present invention, manners of pre-obtaining the mapping relationship between first downlink assignment information and a preamble are disclosed and specifically include the following three types:

a manner in which the UE acquires the mapping relationship that is between first downlink assignment information and a preamble and that is originally in a communications protocol;

a manner in which the UE acquires the mapping relationship that is between first downlink assignment information and a preamble and that is carried in a broadcast message sent by the base station; and a manner in which the UE acquires the mapping relationship that is between first downlink assignment information and a preamble and that is carried in a dedicated message sent by the base station.

S303. The UE receives, according to the first downlink assignment information, a random access response message sent by the base station.

Likewise, according to the random access method disclosed in this embodiment of the present invention, first downlink assignment information is obtained in a manner of a mapping relationship between first downlink assignment information and a preamble, where the first downlink assignment information is downlink assignment information used by a random access response message, and scheduling signaling of the random access response message does not need to be retransmitted by using the PDCCH channel, thereby resolving problems of a channel resource waste and an access delay in an existing random access method. The problems are caused because the PDCCH channel is used to retransmit the scheduling signaling of the random access response message.

Figure 7:
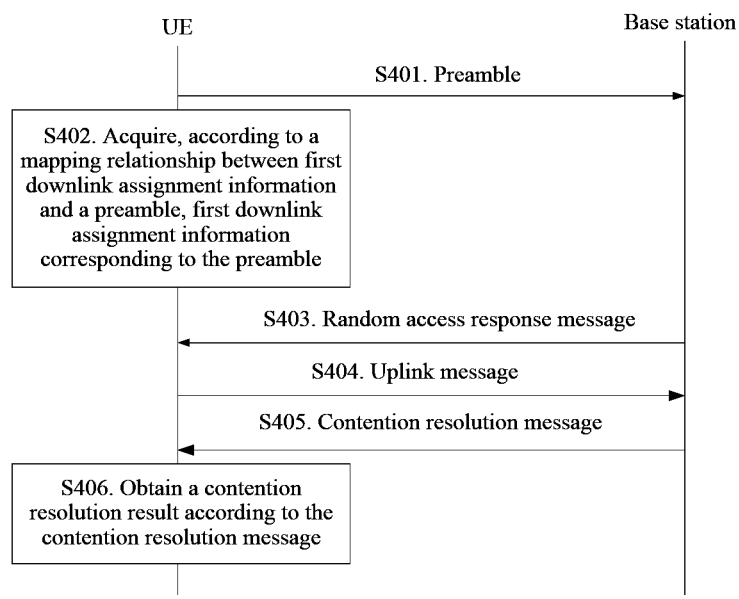
FIG. 7 is a sequence diagram of a random access method according to another embodiment of the present invention.

Another embodiment of the present invention further discloses a random access method. With reference to FIG. 7, the random access method includes:

S401. User equipment UE sends a preamble to a base station.

S402. The UE acquires, according to a pre-obtained mapping relationship between first downlink assignment information and a preamble, first downlink assignment information corresponding to the preamble sent by the UE.

The first downlink assignment information is downlink assignment information used by a random access response message.

S403. The UE receives, according to the first downlink assignment information, a random access response message sent by the base station.

S404. The UE sends an uplink message to the base station by using pre-obtained first uplink grant information.

The uplink message carries identification information of the UE, and the first uplink grant information is uplink grant information used by the uplink message.

Specifically, the first uplink grant information includes information such as a physical resource, a modulation and coding scheme, a redundancy version, and an HARQ (Hybrid Automatic Repeat Request, hybrid automatic repeat request) process ID that are used by the uplink message.

When sending the uplink message to the base station, the UE needs to first determine the uplink grant information used by the uplink message. The following gives specific illustration by using two embodiments.

In a first embodiment, the UE acquires a mapping relationship between first uplink grant information and a preamble; and the UE acquires, according to the mapping relationship between first uplink grant information and a preamble, first uplink grant information corresponding to the preamble sent by the UE, where specifically, the mapping relationship between first uplink grant information and a preamble is carried in a communications protocol, a broadcast message sent by the base station, or a dedicated message sent by the base station.

In a second embodiment, the UE acquires first uplink grant information carried in the random access response message received by the UE.

Preferably, in another embodiment of the present invention, after step S404 in which the UE sends the uplink message to the base station, further includes:

acquiring, by the UE, a time at which the UE receives a contention resolution message, where the time at which the UE receives the contention resolution message is carried in the random access response message sent by the base station, a communications protocol, a broadcast message sent by the base station, or a dedicated message sent by the base station.

In this case, the UE needs to receive the contention resolution message only at the time at which the UE receives the contention resolution message, which can reduce resource overheads of the UE.

S405. The UE receives, by using pre-obtained second downlink assignment information, a contention resolution message sent by the base station.

The second downlink assignment information is downlink assignment information used by the contention resolution message. Specifically, the second downlink assignment information includes information such as a physical resource, a modulation and coding scheme, a redundancy version, and an HARQ (Hybrid Automatic Repeat Request, hybrid automatic repeat request) process ID that are used by the contention resolution message.

Likewise, before receiving the contention resolution message sent by the base station, the UE also needs to learn the downlink assignment information used by the contention resolution message. A specific implementation form may include:

acquiring, by the UE, a mapping relationship between second downlink assignment information and a preamble; and acquiring, by the UE according to the mapping relationship between second downlink assignment information and a preamble, second downlink assignment information corresponding to the preamble sent by the UE, where the mapping relationship between second downlink assignment information and a preamble is carried in a communications protocol, a broadcast message sent by the base station, or a dedicated message sent by the base station.

Alternatively, the specific implementation form may be: acquiring, by the UE, second downlink assignment information carried in the random access response message received by the UE.

S406. The UE obtains a contention resolution result according to the contention resolution message.

Preferably, in another embodiment of the present invention, a manner in which the UE obtains the contention resolution result according to the contention resolution message specifically includes:

acquiring, by the UE, the identification information of the UE that is carried in the contention resolution message; and obtaining, by the UE, the contention resolution result according to the identification information of the UE.

In another embodiment of the present invention, the manner in which the UE obtains the contention resolution result according to the contention resolution message may further include:

demasking, by the UE, the contention resolution message to obtain the identification information of the UE; and obtaining, by the UE, the contention resolution result according to the identification information of the UE.

Another embodiment of the present invention further discloses a random access method. Different from disclosed in the foregoing embodiment, the contention resolution message received by the UE further carries third downlink assignment information used when the UE receives data sent by the base station.

The third downlink assignment information includes information such as a physical resource, a modulation and coding scheme, a redundancy version, and an HARQ (Hybrid Automatic Repeat Request, hybrid automatic repeat request) process ID that are used by the data sent by the base station.

In addition, when the third downlink assignment information is used to control, at least twice, the UE to receive the data sent by the base station, the contention resolution message further carries an interval of using the third downlink assignment information and use times of the third downlink assignment information.

The contention resolution message received by the UE further carries second uplink grant information used when the UE sends data to the base station.

The second uplink grant information includes information such as a physical resource, a modulation and coding scheme, a redundancy version, and an HARQ (Hybrid Automatic Repeat Request, hybrid automatic repeat request) process ID that are used by the data received by the base station.

In addition, when the second uplink grant information is used to control, at least twice, the UE to send the data to the base station, the contention resolution message further carries an interval of using the second uplink grant information and use times of the second uplink grant information.

Figure 8:
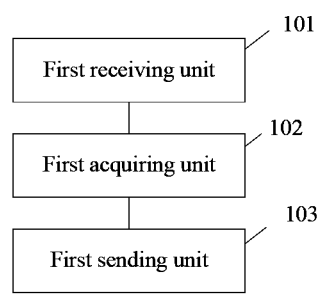
FIG. 8 is a schematic structural diagram of a base station according to an embodiment of the present invention.

Another embodiment of the present invention further discloses a base station. With reference to FIG. 8, includes:

a first receiving unit 101, configured to receive a preamble sent by user equipment UE;

a first acquiring unit 102, configured to acquire, according to a pre-obtained mapping relationship between first downlink assignment information and a preamble, first downlink assignment information corresponding to the preamble received by the first receiving unit 101, where the first downlink assignment information is downlink assignment information used by a random access response message; and a first sending unit 103, configured to send the random access response message to the UE according to the first downlink assignment information.

According to the base station disclosed in this embodiment, a first acquiring unit 102 obtains first downlink assignment information in a manner of a mapping relationship between first downlink assignment information and a preamble, where the first downlink assignment information is downlink assignment information used by a random access response message, and scheduling signaling of the random access response message does not need to be retransmitted by using the PDCCH channel, thereby resolving problems of a channel resource waste and an access delay in an existing random access method. The problems are caused because the PDCCH channel is used to retransmit the scheduling signaling of the random access response message.

Specifically, for a working process of each component of the base station disclosed in this embodiment, refer to the embodiment corresponding to FIG. 1. Details are not described herein.

Figure 9:
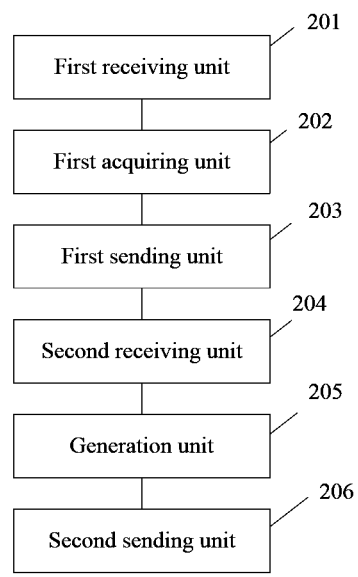
FIG. 9 is a schematic structural diagram of a base station according to another embodiment of the present invention.

Another embodiment of the present invention further discloses a base station. With reference to FIG. 9, the base station includes:

a first receiving unit 201, configured to receive a preamble sent by user equipment UE;

a first acquiring unit 202, configured to acquire, according to a pre-obtained mapping relationship between first downlink assignment information and a preamble, first downlink assignment information corresponding to the preamble received by the first receiving unit 201, where the first downlink assignment information is downlink assignment information used by a random access response message; where preferably, in another embodiment of the present invention, the mapping relationship between first downlink assignment information and a preamble is carried in a communications protocol, a broadcast message sent by the base station, or a dedicated message sent by the base station;

a first sending unit 203, configured to send the random access response message to the UE according to the first downlink assignment information;

a second receiving unit 204, configured to receive, by using pre-obtained first uplink grant information, an uplink message sent by the UE, where the uplink message carries identification information of the UE, and the first uplink grant information is uplink grant information used by the uplink message;

a generation unit 205, configured to generate a contention resolution message according to the identification information of the UE that is carried in the uplink message; where preferably, the generation unit 205 includes: a first generation unit, configured to mask the contention resolution message by using the identification information of the UE; and/or a second generation unit, configured to write the identification information of the UE into the contention resolution message; and a second sending unit 206, configured to send the contention resolution message to the UE by using pre-obtained second downlink assignment information, where the second downlink assignment information is downlink assignment information used by the contention resolution message.

Preferably, the random access response message sent by the second sending unit 206 further carries a time at which the UE receives the contention resolution message; or a time at which the UE receives the contention resolution message is carried in a broadcast message sent by the base station, a dedicated message sent by the base station, or a communications protocol.

It should further be noted herein that the contention resolution message may further include: third downlink assignment information used when the base station sends data to the UE, or second uplink grant information used when the base station receives data sent by the UE.

In addition, when the third downlink assignment information is used to control, at least twice, the base station to send the data to the UE, the contention resolution message further includes an interval of using the third downlink assignment information and use times of the third downlink assignment information.

When the second uplink grant information is used to control, at least twice, the base station to receive the data sent by the UE, the contention resolution message further includes an interval of using the second uplink grant information and use times of the second downlink assignment information.

Preferably, in another embodiment of the present invention, the base station further includes:

a second acquiring unit, configured to acquire a mapping relationship between first uplink grant information and a preamble, where the mapping relationship between first uplink grant information and a preamble is carried in a communications protocol, a broadcast message sent by the base station, or a dedicated message sent by the base station; and a third acquiring unit, configured to acquire, according to the mapping relationship that is between first uplink grant information and a preamble and that is acquired by the second acquiring unit, first uplink grant information corresponding to the preamble received by the first receiving unit.

Preferably, in another embodiment of the present invention, the base station further includes:

a fourth acquiring unit, configured to acquire first uplink grant information carried in the random access response message sent by the first sending unit.

Preferably, in another embodiment of the present invention, the base station further includes:

a fifth acquiring unit, configured to acquire a mapping relationship between second downlink assignment information and a preamble, where the mapping relationship between second downlink assignment information and a preamble is carried in a communications protocol, a broadcast message sent by the base station, or a dedicated message sent by the base station; and a sixth acquiring unit, configured to acquire, according to the mapping relationship that is between second downlink assignment information and a preamble and that is acquired by the fifth acquiring unit, second downlink assignment information corresponding to the preamble received by the first receiving unit.

Preferably, in another embodiment of the present invention, the base station further includes a seventh acquiring unit, configured to acquire second downlink assignment information carried in the random access response message sent by the first sending unit.

For a specific working process of each component of the base station disclosed in multiple embodiments herein, refer to the embodiment corresponding to FIG. 2. Details are not described herein.

Figure 10:
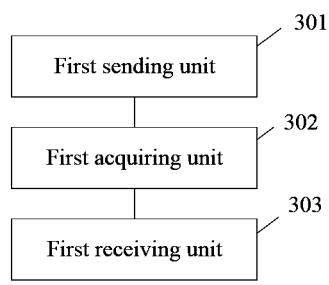
FIG. 10 is a schematic structural diagram of user equipment according to an embodiment of the present invention.

Another embodiment of the present invention further discloses user equipment UE. With reference to FIG. 10, the user equipment includes:

a first sending unit 301, configured to send a preamble to a base station;

a first acquiring unit 302, configured to acquire, according to a pre-obtained mapping relationship between first downlink assignment information and a preamble, first downlink assignment information corresponding to the preamble sent by the first sending unit, where the first downlink assignment information is downlink assignment information used by a random access response message; where preferably, in another embodiment of the present invention, the mapping relationship between first downlink assignment information and a preamble is carried in a communications protocol, a broadcast message sent by the base station, or a dedicated message sent by the base station; and a first receiving unit 303, configured to receive, according to the first downlink assignment information, the random access response message sent by the base station.

According to the user equipment disclosed in this embodiment, a first acquiring unit 302 obtains first downlink assignment information in a manner of a mapping relationship between first downlink assignment information and a preamble, where the first downlink assignment information is downlink assignment information used by a random access response message, and scheduling signaling of the random access response message does not need to be retransmitted by using the PDCCH channel, thereby resolving problems of a channel resource waste and an access delay in an existing random access method. The problems are caused because the PDCCH channel is used to retransmit the scheduling signaling of the random access response message.

For a working process of each component of the user equipment disclosed in this embodiment, refer to content of the embodiment corresponding to FIG. 6. Details are not described herein.

Figure 11:
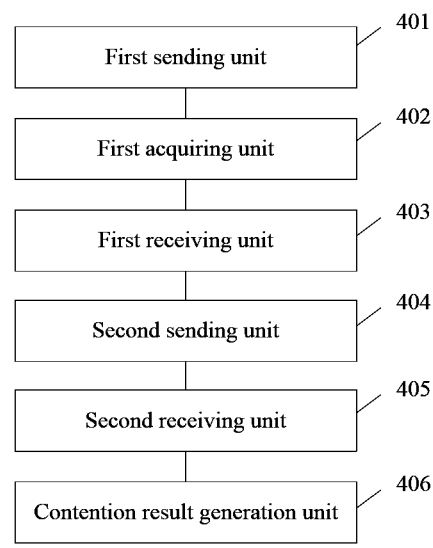
FIG. 11 is a schematic structural diagram of user equipment according to another embodiment of the present invention.

Another embodiment of the present invention further discloses user equipment UE. With reference to FIG. 11, the user equipment includes:

a first sending unit 401, configured to send a preamble to a base station;

a first acquiring unit 402, configured to acquire, according to a pre-obtained mapping relationship between first downlink assignment information and a preamble, first downlink assignment information corresponding to the preamble sent by the first sending unit, where the first downlink assignment information is downlink assignment information used by a random access response message;

a first receiving unit 403, configured to receive, according to the first downlink assignment information, the random access response message sent by the base station;

a second sending unit 404, configured to send an uplink message to the base station by using pre-obtained first uplink grant information, where the uplink message carries identification information of the UE, and the first uplink grant information is uplink grant information used by the uplink message;

a second receiving unit 405, configured to receive, by using pre-obtained second downlink assignment information, a contention resolution message sent by the base station, where the second downlink assignment information is downlink assignment information used by the contention resolution message; and a contention result generation unit 406, configured to obtain a contention resolution result according to the contention resolution message.

Preferably, in another embodiment of the present invention, the contention result generation unit 406 includes:

a demasking unit, configured to demask the contention resolution message to obtain the identification information of the UE; and a first contention result generating subunit, configured to obtain the contention resolution result according to the identification information of the UE.

Preferably, in another embodiment of the present invention, the contention result generation unit 406 includes:

a ninth acquiring unit, configured to acquire the identification information of the UE that is carried in the contention resolution message; and a second contention result generating subunit, configured to obtain the contention resolution result according to the identification information of the UE.

It should further be noted herein that the contention resolution message received by the UE further includes:

third downlink assignment information used when the UE receives data sent by the base station, and/or second uplink grant information used when the UE sends data to the base station.

In addition, when the third downlink assignment information is used to control, at least twice, the UE to receive the data sent by the base station, the contention resolution message further includes an interval of using the third downlink assignment information and use times of the third downlink assignment information.

When the second uplink grant information is used to control, at least twice, the UE to send the data to the UE, the contention resolution message further includes an interval of using the second uplink grant information and use times of the second uplink grant information.

Preferably, in another embodiment of the present invention, the UE further includes:

a second acquiring unit, configured to acquire a mapping relationship between first uplink grant information and a preamble, where the mapping relationship between first uplink grant information and a preamble is carried in a communications protocol, a broadcast message sent by the base station, or a dedicated message sent by the base station; and a third acquiring unit, configured to acquire, according to the mapping relationship between first uplink grant information and a preamble, first uplink grant information corresponding to the preamble sent by the first sending unit.

Preferably, in another embodiment of the present invention, the UE further includes a fourth acquiring unit, configured to acquire first uplink grant information carried in the random access response message received by the first receiving unit.

Preferably, in another embodiment of the present invention, the UE further includes:

a fifth acquiring unit, configured to acquire a mapping relationship between second downlink assignment information and a preamble, where the mapping relationship between second downlink assignment information and a preamble is carried in a communications protocol, a broadcast message sent by the base station, or a dedicated message sent by the base station; and a sixth acquiring unit, configured to acquire, according to the mapping relationship between second downlink assignment information and a preamble, second downlink assignment information corresponding to the preamble sent by the first sending unit.

Preferably, in another embodiment of the present invention, the UE further includes:

a seventh acquiring unit, configured to acquire second downlink assignment information carried in the random access response message received by the first receiving unit.

Preferably, in another embodiment of the present invention, the UE further includes:

an eighth acquiring unit, configured to acquire a time at which the first receiving unit receives the contention resolution message, where the time at which the first receiving unit receives the contention resolution message is carried in the random access response message sent by the base station, a communications protocol, a broadcast message sent by the base station, or a dedicated message sent by the base station.

For a detailed working process of each component of the UE disclosed in multiple embodiments herein, refer to the embodiment corresponding to FIG. 7. Details are not described herein.

If the functions of the method in the embodiment are implemented in the form of a software functional unit and sold or used as an independent product, the functions may be stored in a computing device-readable storage medium. Based on such an understanding, the part of the embodiments of the present invention contributing to the prior art or some of the technical solutions may be implemented in a form of a software product. The software product is stored in a storage medium, and includes several instructions for instructing a computing device (which may be a personal computer, a server, or a network device) to perform all or some of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The embodiments in this specification are all described in a progressive manner, for same or similar parts in the embodiments, reference may be made to these embodiments, and each embodiment focuses on a difference from other embodiments.

The embodiments disclosed above are described to enable persons skilled in the art to implement or use the present invention. Various modifications to the embodiments are obvious to the person skilled in the art, and general principles defined in this specification may be implemented in other embodiments without departing from the spirit or scope of the present invention. Therefore, the present invention will not be limited to the embodiments described in this specification but extends to the widest scope that complies with the principles and novelty disclosed in this specification.

What is claimed is:

1. A random access method, carried out on a base station, comprising:
   receiving a preamble sent by a user equipment (UE);
   acquiring, according to a pre-obtained first downlink assignment information mapping relationship, a first downlink assignment information mapped to the preamble based on the mapping relationship, wherein the first downlink assignment information is downlink assignment information used by a random access response message; and
   sending the random access response message to the UE according to the first downlink assignment information,
   wherein, after the sending the random access response message to the UE, the method further comprises:
      receiving, by using uplink resources indicated in a pre-obtained first uplink grant information, an uplink message sent by the UE, wherein the uplink message carries an identification information of the UE, and the pre-obtained first uplink grant information is uplink grant information used by the uplink message;
      generating a contention resolution message according to the identification information of the UE that is carried in the uplink message; and
      sending, by using downlink resources indicated in a pre-obtained second downlink assignment information, the contention resolution message to the UE, wherein the pre-obtained second downlink assignment information is downlink assignment information used by the contention resolution message.

2. The method according to claim 1, wherein the first downlink assignment information mapping relationship is carried in at least one of the groups consisting of: a communications protocol, a broadcast message sent by the base station, and a dedicated message sent by the base station.

3. The method according to claim 1, wherein a manner in which the base station pre-obtains the pre-obtained first uplink grant information comprises:
acquiring a first uplink grant information mapping relationship; and
acquiring, according to the first uplink grant information mapping relationship, the pre-obtained first uplink grant information corresponding to the preamble received by the base station,
wherein the first uplink grant information mapping relationship is carried in at least one of the group consisting of: a communications protocol, a broadcast message sent by the base station, and a dedicated message sent by the base station.

4. The method according to claim 1, wherein the generating a contention resolution message according to the identification information of the UE that is carried in the uplink message comprises:
masking the contention resolution message by using the identification information of the UE; and
writing the identification information of the UE into the contention resolution message.

5. A random access method, carried out on a user equipment (UE), comprising:
sending a preamble to a base station;
acquiring, according to a pre-obtained first downlink assignment information mapping relationship, a first downlink assignment information mapped to the preamble based on the mapping relationship and sent by the UE, wherein the first downlink assignment information is downlink assignment information used by a random access response message sent by the base station; and
receiving, according to the first downlink assignment information, the random access response message sent by the base station,
wherein, after the receiving the random access response message sent by the base station, the method further comprises:
sending, by using uplink resources indicated in a pre-obtained first uplink grant information, an uplink message to the base station, wherein the uplink message carries an identification information of the UE, and the pre-obtained first uplink grant information is uplink grant information used by the uplink message;
receiving, by using downlink resources indicated in a pre-obtained second downlink assignment information, a contention resolution message sent by the base station, wherein the pre-obtained second downlink assignment information is downlink assignment information used by the contention resolution message; and
obtaining a contention resolution result according to the contention resolution message.

6. The method according to claim 5, wherein the pre-obtained first downlink assignment information mapping relationship is carried in at least one of the group consisting of: a communications protocol, a broadcast message sent by the base station, and a dedicated message sent by the base station.

7. The method according to claim 5, wherein a manner in which the UE pre-obtains the pre-obtained first uplink grant information comprises:
acquiring a first uplink grant information mapping relationship; and
acquiring, according to the first uplink grant information mapping relationship, a first uplink grant information corresponding to the preamble sent by the UE,
wherein the first uplink grant information mapping relationship is carried in at least one of the group consisting of: a communications protocol, a broadcast message sent by the base station, and a dedicated message sent by the base station.

8. The method according to claim 5, wherein a manner in which the UE pre-obtains the second downlink assignment information comprises:
acquiring a second downlink assignment information mapping relationship; and
acquiring, according to the second downlink assignment information mapping relationship, a second downlink assignment information corresponding to the preamble sent by the UE,
wherein the second downlink assignment information mapping relationship is carried in at least one of the group consisting of: a communications protocol, a broadcast message sent by the base station, and a dedicated message sent by the base station.

9. A base station, comprising:
a processor; and
a non-transitory computer readable medium including computer-executable instructions that, when executed by the processor, facilitate the base station carrying out a method comprising:
receiving a preamble sent by a user equipment (UE);
acquiring, according to a pre-obtained first downlink assignment information mapping relationship, a first downlink assignment information mapped to the preamble based on the mapping relationship, wherein the first downlink assignment information is downlink assignment information used by a random access response message; and
sending the random access response message to the UE according to the first downlink assignment information,
wherein the method carried out by the base station further comprises:
receiving, by using uplink resources indicated in a pre-obtained first uplink grant information, an uplink message sent by the UE, wherein the uplink message carries an identification information of the UE, and the pre-obtained first uplink grant information is uplink grant information used by the uplink message;
generating a contention resolution message according to the identification information of the UE that is carried in the uplink message; and
sending, by using downlink resources indicated in a pre-obtained second downlink assignment information, the contention resolution message to the UE, wherein the pre-obtained second downlink assignment information is downlink assignment information used by the contention resolution message.

10. The base station according to claim 9, wherein the first downlink assignment information mapping relationship is carried in at least one of the groups consisting of: a communications protocol, a broadcast message sent by the base station, and a dedicated message sent by the base station.

11. The base station according to claim 9, wherein a manner in which the base station pre-obtains the pre-obtained first uplink grant information comprises:
  acquiring a first uplink grant information mapping relationship, and
  acquiring, according to the first uplink grant information mapping relationship, the pre-obtained first uplink grant information corresponding to the preamble received by the base station,
  wherein the first uplink grant information mapping relationship is carried in at least one of the group consisting of: a communications protocol, a broadcast message sent by the base station, and a dedicated message sent by the base station.

12. The base station according to claim 11, wherein the generating comprises:
  masking the contention resolution message by using the identification information of the UE; and
  writing the identification information of the UE info the contention resolution message.

13. A user equipment (UE), comprising:
  a processor; and
  a non-transitory computer readable medium including computer-executable instructions that, when executed by the processor, facilitate the UE carrying out a method comprising:
  sending a preamble to a base station;
  acquiring, according to a pre-obtained first downlink assignment information mapping relationship, a first downlink assignment information mapped to the preamble based on the mapping relationship and sent by the first sending unit, wherein the first downlink assignment information is downlink assignment information used by a random access response message sent by the base station; and
  receiving, according to the first downlink assignment information, the random access response message sent by the base station,
  wherein the method carried out by the UE further comprises:
    sending, by using uplink resources indicated in a pre-obtained first uplink grant information, an uplink message to the base station, wherein the uplink message carries an identification information of the UE, and the pre-obtained first uplink grant information is uplink grant information used by the uplink message;
    receiving, by using downlink resources indicated in a pre-obtained second downlink assignment information, a contention resolution message sent by the base station, wherein the pre-obtained second downlink assignment information is downlink assignment information used by the contention resolution message; and
    obtaining a contention resolution result according to the contention resolution message.

14. The user equipment according to claim 13, wherein the first downlink assignment information mapping relationship is carried in at least one of the group consisting of: a communications protocol, a broadcast message sent by the base station, and a dedicated message sent by the base station.

15. The user equipment according to claim 13, the method further comprising:
  acquiring a first uplink grant information mapping relationship; and
  acquiring, according to the first uplink grant information mapping relationship, first uplink grant information corresponding to the preamble sent by the UE,
  wherein the first uplink grant information mapping relationship is carried in at least one of the group consisting of: a communications protocol, a broadcast message sent by the base station, and a dedicated message sent by the base station.

16. The user equipment according to claim 13, the method further comprising:
  acquiring a second downlink assignment information mapping relationship, wherein the second downlink assignment information mapping relationship is carried in at least one of the group consisting of: a communications protocol, a broadcast message sent by the base station, and a dedicated message sent by the base station; and
  acquiring, according to the second downlink assignment information mapping relationship, a second downlink assignment information corresponding to the preamble sent by the transmitter.

* * * * *

UNITED STATES PATENT AND TRADEMARK OFFICE
CERTIFICATE OF CORRECTION

PATENT NO. : 10,462,822 B2  
APPLICATION NO. : 15/197289  
DATED : October 29, 2019  
INVENTOR(S) : Quan et al.

Page 1 of 1

It is certified that error appears in the above-identified patent and that said Letters Patent is hereby corrected as shown below:

In the Claims

Claim 2, Column 25, Line 5: "groups" should read -- group --.

Claim 10, Column 26, Line 67: "groups" should read -- group --.

Claim 12, Column 27, Line 21: "info" should read -- into --.

Signed and Sealed this  
Fourth Day of May, 2021

Drew Hirshfeld  
*Performing the Functions and Duties of the*  
*Under Secretary of Commerce for Intellectual Property and*  
*Director of the United States Patent and Trademark Office*